United States Patent [19]

Saliger

[11] Patent Number: 4,555,118
[45] Date of Patent: Nov. 26, 1985

[54] SEAL CONSTRUCTION FOR FLUID SWIVEL JOINTS

[75] Inventor: Kenneth C. Saliger, DeSoto, Tex.

[73] Assignee: Mobil Oil Corporation, New York, N.Y.

[21] Appl. No.: 454,826

[22] Filed: Dec. 30, 1982

[51] Int. Cl.$^4$ ................................................. F16S 9/00
[52] U.S. Cl. .................................. 277/188 R; 277/30; 285/275
[58] Field of Search ................ 285/275; 277/181, 182, 277/183, 189, 205, 27, 30, 188 R, 188 A, 83

[56] References Cited

U.S. PATENT DOCUMENTS

| | | | |
|---|---|---|---|
| 2,655,391 | 10/1953 | Atkins | 285/275 |
| 2,687,335 | 8/1954 | Bowerman | 277/188 R |
| 2,805,086 | 9/1957 | Shumaker | |
| 2,894,268 | 7/1959 | Griebe | 9/8 |
| 2,894,769 | 7/1959 | Richmond et al. | 277/83 |
| 3,179,423 | 4/1965 | McCloud | 277/30 |
| 3,590,407 | 7/1971 | Repp | 9/8 |
| 3,848,880 | 11/1974 | Tanner | 277/188 R |
| 4,098,526 | 7/1978 | Du Bois | |

FOREIGN PATENT DOCUMENTS 940951 5/1960 United Kingdom .

Primary Examiner—Robert I. Smith
Attorney, Agent, or Firm—Alexander J. McKillop; Michael G. Gilman; Charles J. Speciale

[57] ABSTRACT

Face and radial sealing arrangements for a fluid swivel joint such as is commonly used on offshore loading terminals for tankers. The sealed fluid joint includes first and second adjacent joint rings which are rotatable relative to each other about a common central longitudinal axis. The joint rings have a small annular, ring-shaped clearance gap therebetween to allow relative rotational movement, and one of the rings defines an annular seal housing groove adjacent to the clearance gap. An annular seal is positioned in the seal housing groove, and its components include an annular, sealing member and an adjacent antiextrusion ring to prevent the pliant sealing member from being deformed into the clearance gap by the relatively high fluid pressure differential existing across the seal. The present invention is particularly characterized by a construction in which the antiextrusion ring or the sealing member is biased, either mechanically by springs or by the pressure differential across the seal, against an adjacent sealing surface to provide an effective high pressure fluid seal therebetween and also to minimize the extrusion gap existing within the seal. Moreover, the components of the seal are relatively free floating to compensate for eccentricity or other variations or distortions in the components of the fluid swivel joint.

18 Claims, 7 Drawing Figures

SEAL CONSTRUCTION FOR FLUID SWIVEL JOINTS

BACKGROUND OF THE INVENTION

1. Field of the Invention

The present invention relates generally to a seal construction for a fluid swivel joint, and more particularly, pertains to a seal construction for a large diameter, high pressure fluid and gas swivel joint, such as is commonly used on offshore loading terminals for oil and gas tankers.

2. Description of the Prior Art

The development of subsea petroleum and gas production systems has included a concept wherein a floating processing and storage vessel incorporates as a significant component thereof a high pressure multiple passage fluid swivel joint. The fluid swivel joint essentially includes therein a plurality of stationary fluid passages or pipes extending downwardly from the interior of the fluid swivel joint to carry gas, oil, air, water, or other fluids either up thereto or down therefrom. A plurality of couplings are mounted on the exterior of the fluid swivel joint and are rotatable relative thereto, with each rotatable coupling communicating through the fluid swivel joint with one of the stationary fluid passages or pipes. Griebe U.S. Pat. No. 2,894,268 and Briatiani U.S. Pat. No. 3,590,407 disclose float supported sea terminals utilizing a concept very similar to that described above.

A problem associated with such a fluid swivel joint is in the provision of seals which will withstand the relatively high pressure differentials, often up to 6000 psi thereacross, while also providing for the relative rotational movements associated with the swivel joint. The seals which have been utilized in many of these fluid swivel joints have been V-type lip seals, which often resulted in very large frictional forces in the swivel joints when they are designed to accommodate the high pressure differentials.

Additionally, the high pressure differentials have also resulted in extrusion of the relatively pliant sealing members into the gaps which they are designed to seal. Prior art swivel joints have often been constructed with an outer ring which rotates about an inner ring with radial seals therebetween. High internal pressures often result in deflections in the rings which increase the radial clearance gap. Common seal materials cannot effectively bridge this gap while maintaining the pressure integrity of the sea. Therefore, common seal materials have been reinforced with various elements to increase the materials' physical strength in order to bridge the radial clearance gaps. Unfortunately, the reinforcing elements tend to render the seal material compounds less resilient and more abrasive. Consequently, a seal formed of these compounds must have a higher contact force in order to effect a seal because the less resilient materials have increased resistance to the filling into microgrooves in the mating seal surface so as to seal against any fluid passage. The higher contact stress and the more abrasive nature of the reinforcing elements of the material compounds tend to increase wear of both the seal and the seal mating surface, frequently leading to loss of pressure integrity of the seal. In order to solve the problems of extrusion of the seal materials into the gap, the prior art has also utilized antiextrusion rings of hard plastic or metal to support sealing elements and bridge the clearance gap between the rings of a fluid swivel joint. Unfortunately, these prior art designs have not proven to be totally satisfactory.

SUMMARY OF THE INVENTION

Accordingly, it is a primary object of the present invention to provide an improved sealing arrangement for a fluid swivel joint such as is commonly used in offshore loading terminals for tankers.

A further object of the subject invention is the provision of an improved sealing arrangement of the type described which is designed with a bias-loaded antiextrusion ring or seal to minimize the seal extrusion gap therein.

An additional object herein is the provision of a sealing arrangement for a fluid swivel joint wherein the components of the seal are relatively free floating to compensate for eccentricity or other variations or distortions in the components of the fluid swivel joint.

A further object of the present invention is the provision of a multielement seal for a fluid swivel joint which eliminates many problems associated with previous seals of this kind, such as extrusion of the sealing element and excessive wear of both the seal and seal mating sur- faces.

In accordance with the teachings herein, the present invention provides a sealed fluid joint in which first and second adjacent joint rings are rotatable relative to each other about a common central longitudinal axis. The joint rings have a small annular, ring-shaped clearance gap therebetween to allow for relative rotational movement, and one of the rings defines an annular seal housing groove adjacent to the clearance gap. An annular seal is positioned in the seal housing groove, and its components include an annular sealing member and an adjoining antiextrusion ring to prevent the pliant sealing member from being extruded into the clearance gap by the relatively high fluid pressure differential existing across the seal. The present invention is particularly characterized by a construction in which the antiextrusion ring or the sealing member is biased against an adjacent sealing surface to provide an effective high pressure fluid seal therebetween and also to minimize the extrusion gap existing within the seal.

In several embodiments herein the swivel joint defines a radial seal configuration having a cylindrically shaped clearance gap extending symmetrically around the central longitudinal axis. In other alternative constructions herein, the swivel joint defines a face seal configuration having a radially flat-shaped clearance gap positioned symmetrically around the central longitudinal axis.

In several embodiments herein, the aforesaid biasing is achieved by a spring positioned in the seal housing groove for biasing the annular sealing member against a sealing surface on the second joint ring. In one embodiment, a coil spring is mounted in compression, extending between a wall of the seal housing groove and the annular seal. In another embodiment, a spring extends circumferentially around the annular seal in the annular seal housing groove. In several other particularly advantageous embodiments, the spring biases the antiextrusion ring against the annular sealing member to cause it to bear against a sealing surface on the second joint ring and also to minimize the seal extrusion gap within the seal.

In several particularly advantageous seal designs herein, the seal utilizes the pressure differential existing across the seal to pressure bias the annular sealing member against a sealing surface and also to minimize the seal extrusion gap. In several designs the pressure differential biases the antiextrusion ring against the annular sealing member to cause it to bear against a sealing surface on the second joint ring and also to minimize the antiextrusion gap. In one disclosed embodiment, the pressure differential is utilized to directly bias the annular sealing member against a sealing surface.

In several of the seal designs herein, the annular sealing member is formed with a V-shaped concave slot therein extending along its annular length to take further advantage of the pressure differential. In some of the seal designs, the antiextrusion ring is constructed with an L-shaped cross section, and the annular sealing member is positioned between the two legs of the L. In one design, the V-shaped concave slot has its V opening facing in the direction of the annular clearance gap, while in another the V opening is facing orthogonally away from the annular clearance gap.

Moreover, several multielement seals are disclosed in embodiments designed to eliminate problems associated with prior art seals of this kind such as extrusion of the sealing element and unnecessary wear of both the seal mating surfaces. Several of these seal designs include a secondary sealing member positioned intermediate the pliant sealing member and the antiextrusion ring. In these embodiments O-rings are positioned between the pliant sealing member and the secondary sealing member and also between the secondary sealing member and the antiextrusion ring.

BRIEF DESCRIPTION OF THE DRAWINGS

The foregoing objects and advantages of the present invention for an improved seal construction for fluid swivel joints may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
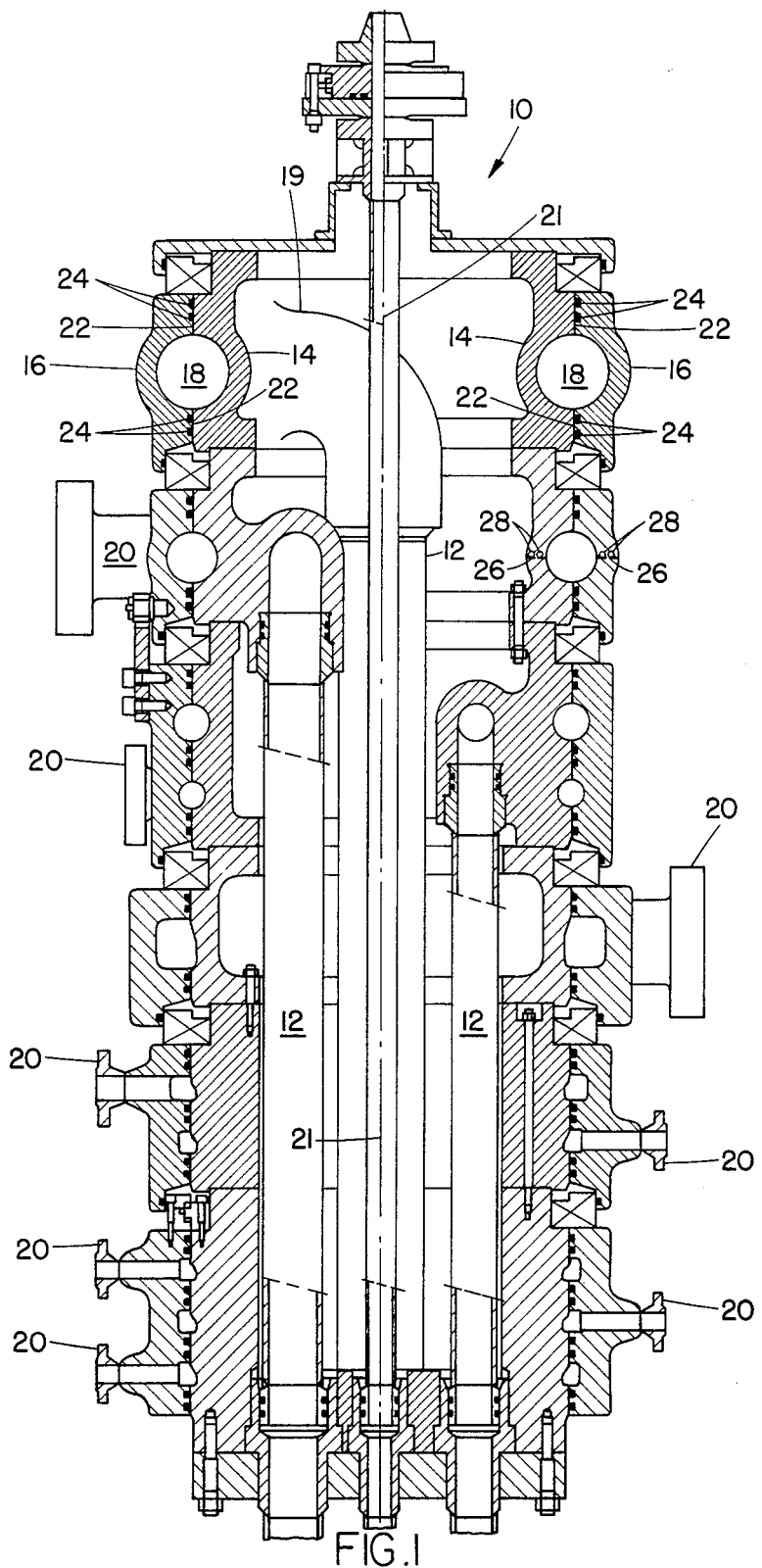
FIG. 1 illustrates an elevational, sectional view of a first known type of fluid swivel joint having a radial type of seal configuration therein.

Referring to the drawings in detail, FIG. 1 is an elevational sectional view of a first known type of fluid swivel joint 10 having radial fluid seals therein. A plurality of nonrotatable fluid passages or pipes 12, of various diameters, extend vertically within the swivel joint to one of ten different levels therein. Typically, these passages or pipes carry gas, oil, air, water, or other fluids either up to or down from the swivel joint 10, at pressures ranging up to 6000 psi. Other arrangements might include either more or less fluid passages and levels in alternative configurations of fluid swivel joints, the outermost diameter of which is often the order of six feet. The uppermost level of the fluid swivel joint is exemplary of the other levels, and includes a relatively stationary, inner joint ring 14 and a rotatable outer joint ring 16. The inner and outer joint rings 14 and 16 define therebetween an annular fluid manifold 18. One of the fluid passages 12 is joined by a coupling 19 through the inner wall of ring 14 to the annular fluid manifold 18, and likewise a coupling 20 (shown for some of the lower levels of the fluid swivel joint) leads from the outer wall of outer joint ring 16. The arrangement is such that a fluid passageway is established from coupling 20, through the fluid manifold 18, to one of the vertical fluid passages 12, while also allowing rotation of coupling 20 and outer joint ring 16 relative to the stationary, inner joint ring 14 and fluid passage or pipe 12. The inner and outer joint rings 14 and 16 have a common concentric longitudinal axis 21, and rotation of the outer ring 16 also takes place about this common axis.

The inner and outer joint rings 14 and 16 define upper and lower small annular clearance gaps 22 therebetween to allow for the relative rotational movements. FIG. 1 illustrates a radial type of swivel joint seal in which the clearance gap 22 forms a generally cylindrical shape. A plurality of annular seals 24 are provided in the clearance gaps 22 to seal the fluid manifold, while also providing for the relative rotational movements, and the present invention is particularly concerned with the construction of these annular seals.

Fluid swivel joints known in the art also utilize a second type of fluid swivel joint having a face type of seal configuration, the construction of which is shown generally in dashed lines on the right side of the second highest level of the fluid swivel joint illustrated in FIG. 1. In this type of seal, each fluid manifold is defined by an upper joint ring and a lower joint ring, and the clearance gap 26 therebetween is a radially flat-shaped gap extending symmetrically around the common central longitudinal axis 21. In a fluid swivel joint having a face type of seal, the upper and lower joint rings are commonly constructed as separate integral parts which are rotatable relative to each other. A plurality of annular seals 28 are provided in the radially flat gap 26, and these seals function similar to the annular seals 24 previously described.

FIGS. 2 through 7 illustrate different embodiments of the present invention of both face and radial types of seals in fluid swivel joints.

Figure 2:
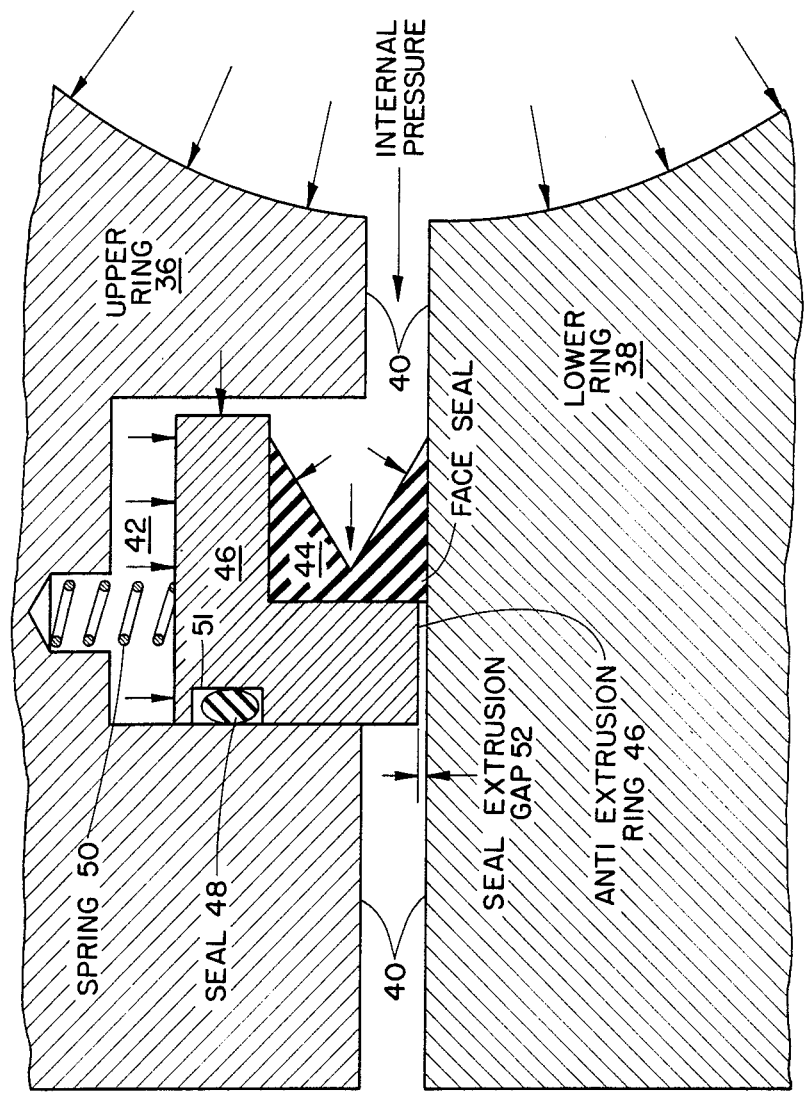
FIGS. 2, 3, 5 and 7 are sectional views through respectively first, second, third and fourth exemplary embodiments of face types of swivel joint seals constructed pursuant to the teachings of the present invention.

Referring to FIG. 2, a fluid swivel joint is formed between a first upper joint ring 36 and a second lower joint ring 38, such that a small, flat annular shaped clearance gap 40 is formed therebetween. An annular seal housing groove 42 is formed around the upper ring 36, adjacent to the gap 40, to position and house therein the components of an annular seal. The annular seal includes an annular, pliant sealing member 44, adapted to form a face fluid seal between the two relatively movable rings 36, 38, and a relatively stiff antiextrusion ring 46. In the embodiment of FIG. 2, the antiextrusion ring 46 has an L-shaped crosssection, with its two L legs disposed substantially orthogonally relative to each other, and the sealing member 44 is positioned within the recess formed between the two legs. The antiextrusion ring 46 functions to prevent the pliant sealing member 44 from being extruded into the clearance gap 40 by the relatively high fluid pressure differential existing across the seal. An O-ring seal 48 is provided in an annular groove 51 in the outer face around the antiextrusion ring 46 to provide a relatively static seal between the antiextrusion ring 46 and the outer lateral side of the annular groove 42.

Coil compression springs 50 are positioned at regular intervals along the length of the antiextrusion ring, extending in compression between the upper wall of the seal housing groove and the upper surface of the antiextrusion ring, to bias the antiextrusion ring, and also the seal member 44 positioned thereunder, against the relatively flat upper sealing surface of the lower ring 38 to provide an initial low pressure seal. The pressure differential across the seal also functions to assist in this bias as the relatively high internal fluid pressure of the manifold 18 is accessible through the gap 40 and a clearance between the internal sides of seal 44 and antiextrusion ring 46 and the internal side of groove 42 to transmit the high internal pressure to the upper surface of the antiextrusion ring 46. A relatively small seal extrusion gap 52 exists between the lower edge of the antiextrusion ring 46 and the upper sealing surface of the lower ring 38, such that the high pressure differential existing across the antiextrusion ring functions to compress the seal 44 tightly against the upper sealing surface of the lower ring 38. Expressed slightly differently, the difference in diameter between the face seal at the lower edge of seal member 44 and the O-ring seal 48 creates an annular piston area to force the antiextrusion ring downwardly against the upper sealing face of the lower ring 38. The downward force on the antiextrusion ring 46 by both the pressure differential and the springs 50 tends to compress the sealing member 44 to minimize or eliminate the seal extrusion gap 52 to thereby effectively prevent extrusion of seal 44 into the gap 52.

The sealing member 44 includes a V-shaped, concave slot in its internal side extending along its annular length, which also tends to take advantage of any pressure differential existing between the lower face of the V slot and the lower surface of the seal member 44 to bias the seal member 44 tightly against the upper sealing surface of the lower ring 44, thereby providing an effective face seal thereat.

The seal construction shown in FIG. 2 also provides a free floating annular seal which can compensate for limited variations in the clearance gap 40 as follows. As shown in FIG. 1, a limited clearance exists between the top of the antiextrusion ring 46 and the top of the annular groove 42 which allows a limited vertical movement of the antiextrusion ring in the groove to compensate for any variations in the clearance gap. This limited movement does not substantially affect the seal extrusion gap.

Figure 3:
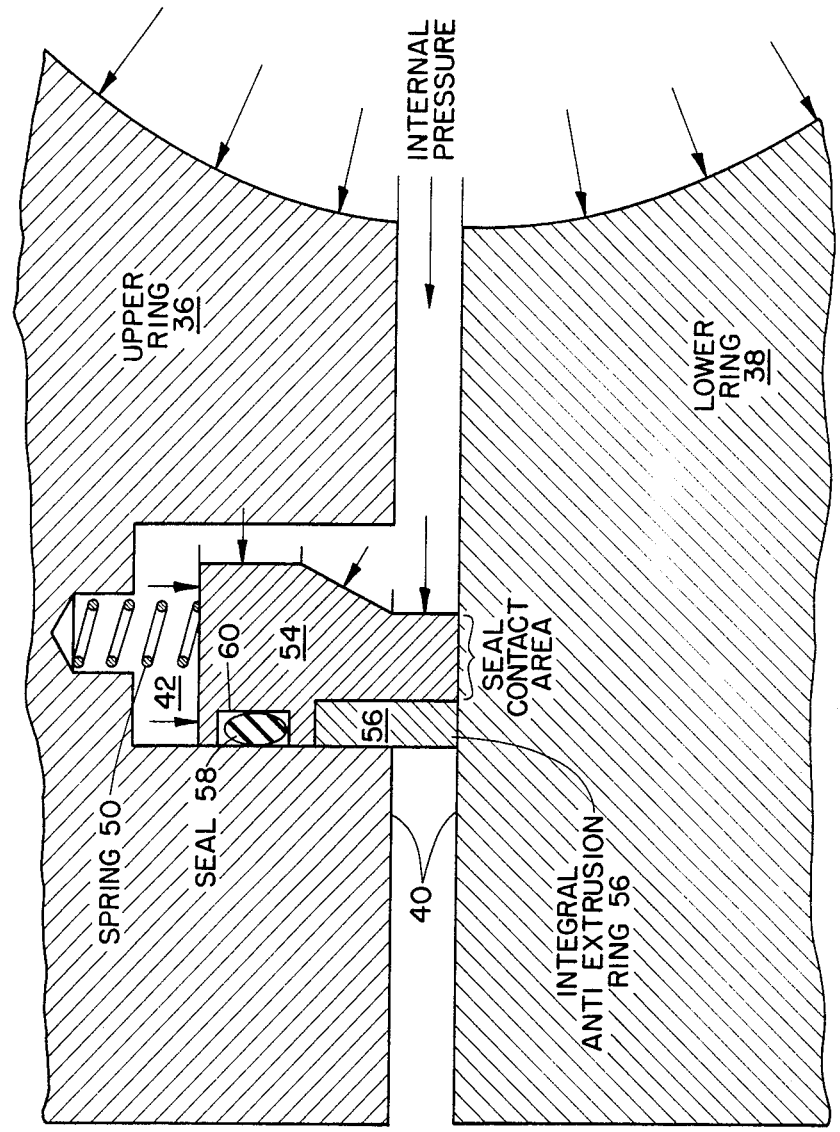

FIG. 3 illustrates a second embodiment of the present invention wherein a pressure-energized, low friction rotary face seal is constructed with an integral antiextrusion ring. In this embodiment, an annular pliant sealing member 54 is constructed as one integral component with an antiextrusion ring 56. An O-ring seal 58 is provided in an annular groove 60 in the outer face around the sealing member 54 to provide a relatively static seal between the sealing member 54 and the outer lateral side of the annular seal housing groove 42. In a manner similar to the embodiment of FIG. 1, coil compression springs 50 extend in compression between the upper wall of the seal housing groove 42 and the upper surface of the sealing member 54 to bias the lower face of the seal 54 against the upper sealing surface of lower ring 38 to provide an initial low pressure seal. The pressure differential across the seal also biases the lower face of the seal 54 against the upper sealing surface of lower ring 38. In a manner similar to the embodiment of FIG. 2, an annular piston area, formed by the difference in seal diameters between the O-ring seal 58 and the seal contact area of face seal 54, creates a net downward pressure difference to bias the lower face of seal 54 against the upper sealing surface of the lower ring 38. The differential pressure force on the annular seal determines to a limited extent the frictional force between the face seal 54 and the lower ring 38, and the seal diameters can be designed and selected to minimize this frictional force while still maintaining the integrity of the fluid pressure seal. The embodiment of FIG. 3 also provides a free floating annular seal in a manner functionally equivalent to the embodiment of FIG. 2.

Figure 4:
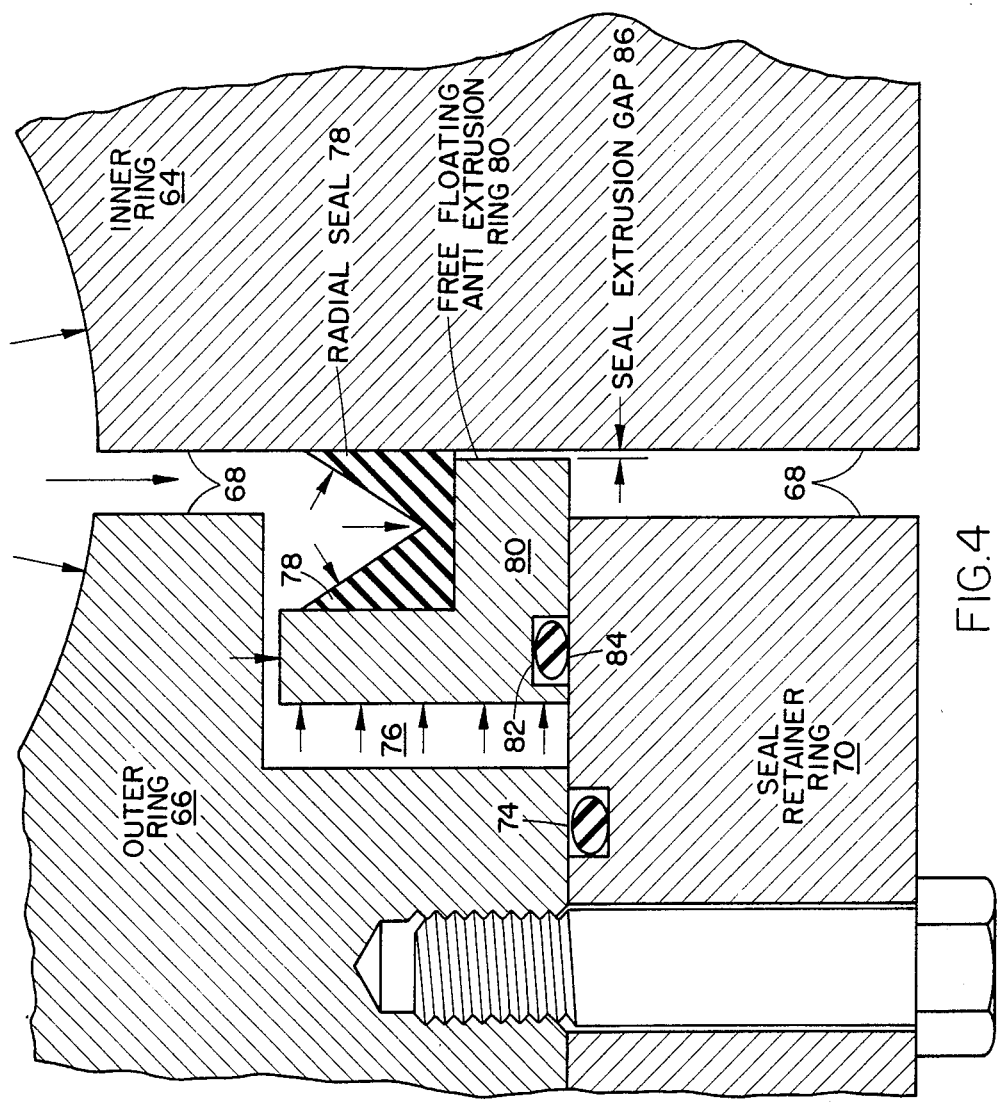
FIGS. 4 and 6 illustrate sectional views through respectively first and second exemplary embodiments of radial types of fluid joint seals according to the teachings of the present invention.

FIG. 4 illustrates a fluid swivel joint having a radial seal therein which includes free floating components to compensate for problems of eccentricity which might be encountered with a radial type of seal. Known prior art seals generally performed satisfactorily in fluid swivel joints with radial seals as long as the inner and outer joint rings remained concentric. However, any eccentricity of the inner and outer joint rings with respect to each other often resulted in plastic antiextrusion rings being broken or deformed to the point of being ineffective. Metal antiextrusion rings, on the other hand, could damage the sealing surfaces of the inner and outer rings if the rings became eccentric. Moreover, eccentricity often resulted in nonuniform radial loading of the seal, which could adversely affect the integrity of the seal or cause uneven seal wearing, thus resulting in premature seal failure. The embodiments described herein, particularly with reference to FIG. 4, are designed to compensate for eccentricity in the inner and outer joint rings and to prevent undesired extrusion of the seal into the clearance gap.

With reference to FIG. 4, the swivel joint of the present invention includes an inner joint ring 64 and an outer joint ring 66, with a radial clearance gap 68 being defined therebetween. A seal retainer ring 70 is secured in place by a plurality of bolts 72, and an O-ring seal 74 seals the two components relative to each other. The seal retainer ring 70 and outer ring 66 together define an annular seal housing groove 76 adjacent to the clearance gap 68. An annular seal is constructed with an annular, pliant sealing member 78 and an L-shaped antiextrusion ring 80, somewhat similar in concept to the embodiment of FIG. 2. The lower surface of the antiextrusion ring 80 defines an annular groove 82 for housing an O-ring 84, to provide a seal between the antiextrusion ring 80 and the seal retainer ring 70. The free floating antiextrusion ring 80 is initially displaced from the inner joint ring 64 by a relatively small seal extrusion gap 86.

In operation, the internal pressure is transmitted through clearance gap 68, and above radial seal 78 and antiextrusion ring 80 to the outer side of the antiextrusion ring, such that the pressure differential across the seal presses the antiextrusion ring against the outer diameter of the seal member 78, and against the outer surface of inner ring 64. Accordingly, this arrangement is pressure-responsive in a manner similar to the embodiment of FIG. 2. Moreover, a clearance is provided between the outer diameter of the antiextrusion ring 80 and the inner diameter of the seal housing groove 76 which allows for limited eccentric horizontal movements of the outer ring 66 relative to the inner ring 64 without adversely affecting either the seal extrusion gap 86 or radial loading of the sealing element 78.

Figure 5:
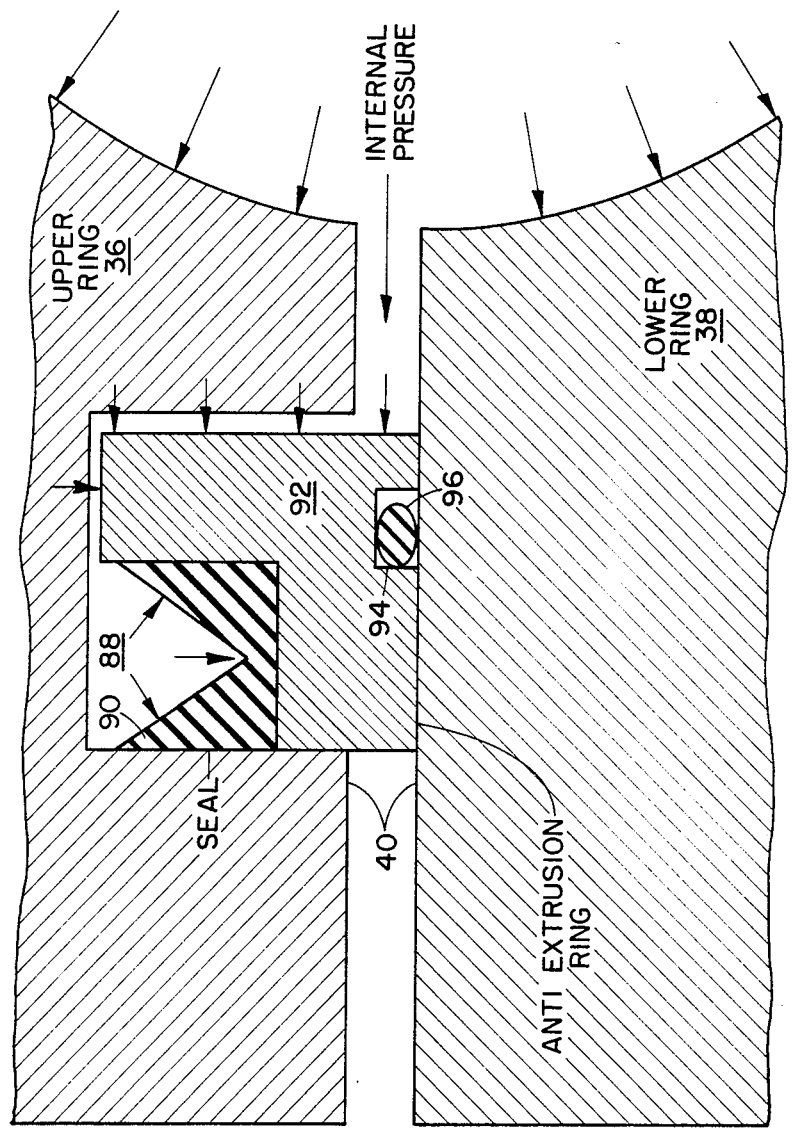

FIG. 5 illustrates an embodiment of a fluid swivel joint having a face seal therein which is somewhat similar in concept to the embodiment of FIG. 4. The upper joint ring 36 defines a seal housing groove 88 therein in which is mounted a sealing element 90 and an L-shaped antiextrusion ring 92. An annular groove 94 in the bottom surface of the antiextrusion ring 92 mounts an O-ring 96 therein to seal the antiextrusion ring relative to the lower ring 38. In operation, the pressure differential across the seal presses the antiextrusion ring downwardly against the upper surface of the lower joint ring 38 such that the two elements remain fastened to each other. Any rotation of the upper joint ring 36 results in it moving relative to the seal elements, such that effectively the seal housing groove 88 rotates relative to the seal elements therein. The pressure differential across the seal also presses the outside surface of seal element 90 against the outer wall of seal housing groove 88. In effect, this embodiment is a hybrid between a face seal and a radial seal, as although it is configured like a face seal, the dynamic seal between sealing element 90 and the outer wall of seal housing groove 88 is similar in concept to a radial seal.

Figure 6:
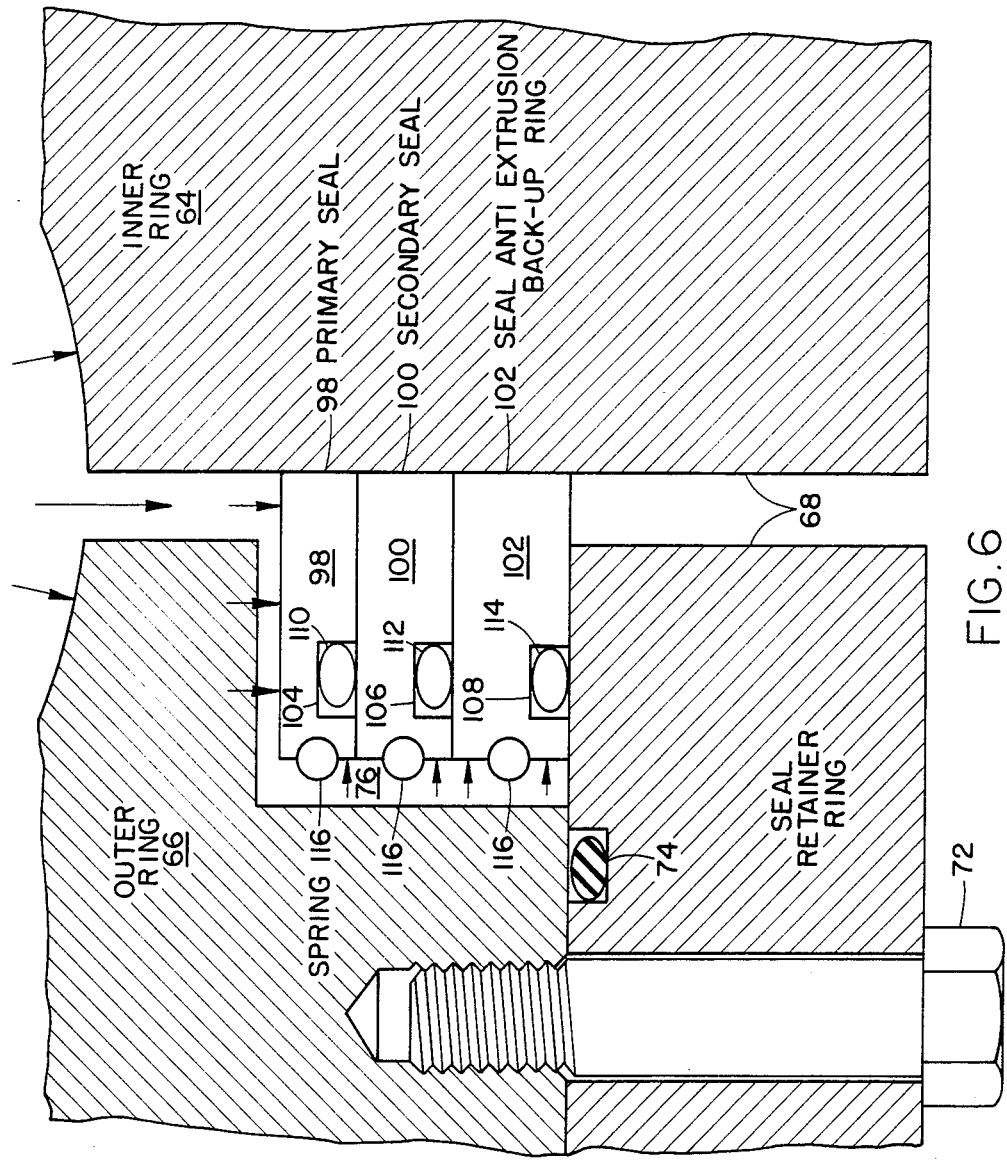

FIG. 6 illustrates a multielement radial seal for a fluid swivel joint which eliminates or ameliorates many problems associated with previous seals of this kind, such as extrusion of the sealing element and unnecessary wear of both the seal and seal mating surfaces. This sealing arrangement includes a primary sealing element 98, a secondary sealing element 100, and an antiextrusion ring 102. The primary sealing element corresponds in its primary sealing function to sealing elements 44, 54, 78 and 90, and is formed of a material providing excellent sealing characteristics, such as a highly resilient but low strength material, for example, rubber or Teflon. Its primary function is to provide a fluid seal against the outer wall of ring 64. The secondary sealing element 100 is constructed of a material having less sealing characteristics and greater strength than the primary sealing element. The major purpose of the second sealing element is to prevent extrusion of the primary seal 98 and also to function as a back-up seal in the event of leakage through the primary seal. The antiextrusion ring 102 serves the same antiextrusion function as elements 46, 54, 70 and 92, and can be constructed of a high-strength material, either metallic or nonmetallic in nature, and generally has little or no sealing properties, the primary function of the antiextrusion element is to bridge the radial clearance gap and provide support for the secondary and primary seal to prevent any seal extrusion thereof.

The primary seal 98, secondary seal 100 and antiextrusion ring 102 each have a circumferential groove respectively 104, 106 and 108 formed in the lower surface thereof in which O-rings 110, 112 and 114 are positioned to provide seals respectively between the primary and secondary seals, the secondary seal and antiextrusion ring, and the antiextrusion ring and seal retainer ring. The O-ring seals allow relative movements between the seal components without loss of pressure integrity. Outer circumferential springs 116, which can be coil springs, are provided in circumferential grooves around the elements 98, 100 and 102 to force each of them into intimate contact with the outer wall of the inner ring 64. The pressure differential existing across the seal, which is maintained by the O-rings 110, 112 and 114, also biases the elements, particularly elements 100 and 102, against the outer wall of the inner ring.

Figure 7:
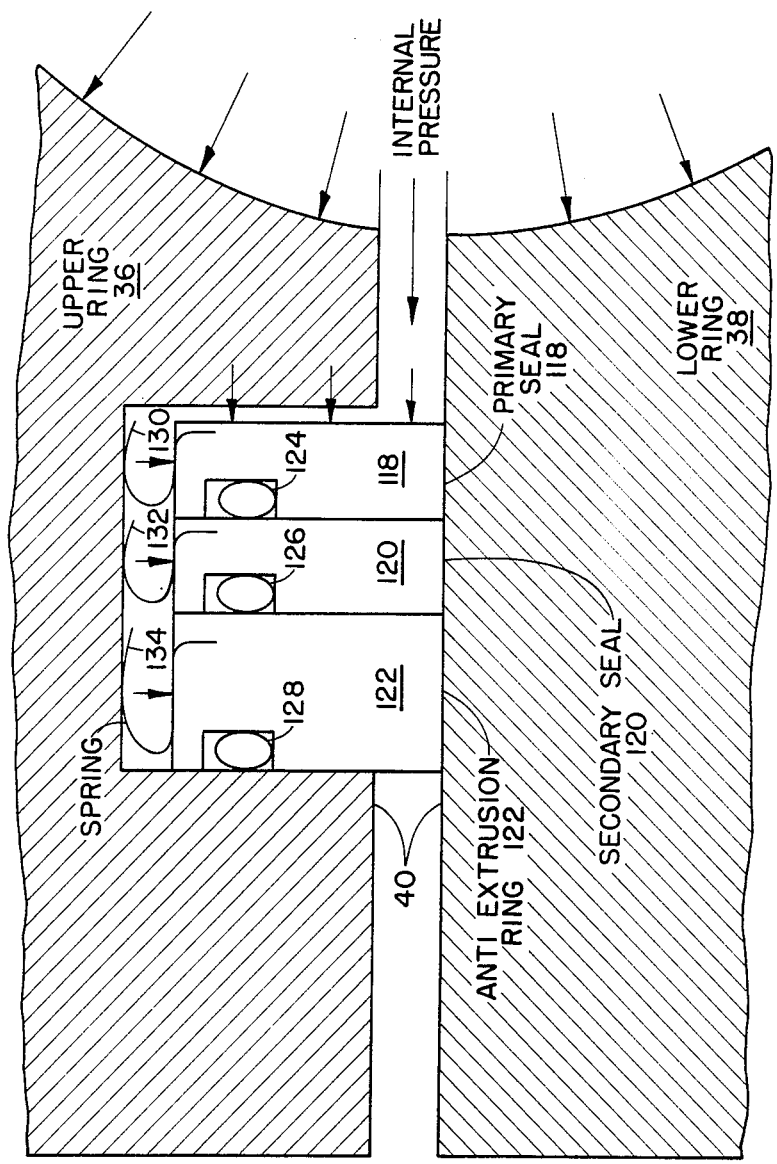

FIG. 7 illustrates a face seal configuration which is somewhat comparable to the radial design of FIG. 6. The face seal configuration includes a primary seal 118, a secondary seal 120 and an antiextrusion ring 122, sealed respectively by O-rings 124, 126 and 128. The elements 118, 120 and 122 are biased against the upper face of the lower ring 38 by a series of springs 130, 132 and 134, which can be leaf springs bent as indicated or any other appropriate type of spring. The pressure differential across the seal also functions to bias the elements, particularly 120 and 122, against the upper surface of the lower ring, in a manner substantially as explained previously herein.

While several embodiments and variations of the present invention for seal constructions for fluid swivel joints are described in detail herein, it should be apparent that the disclosure and teachings of the present invention will suggest many alternative designs to those skilled in the art.

What is claimed is:
1. A sealed fluid swivel joint, comprising:
 a. first and second adjacent joint rings which are rotatable relative to each other about a common central longitudinal axis and defining a small annular, ring-shaped clearance gap therebetween to allow relative rotational movement between the first and second joint rings, said first adjacent ring defining an annular seal housing groove adjacent to said clearance gap;
 b. an annular seal positioned in said annular seal housing groove and adapted to provide a seal between said first joint ring and said second joint ring, said annular seal including an annular, pliant sealing member, and a relatively stiff annular antiextrusion ring to prevent the pliant sealing member from being deformed into said clearance gap by the fluid pressure differential existing across said annular seal, and means for biasing said annular sealing member against an adjacent annular sealing surface to provide an effective fluid seal therebetween, said biasing means being responsive to the pressure differential existing across said annular seal to pressure bias said annular sealing member against a sealing surface, and said annular sealing member including a V-shaped, concave slot therein extending along its annular length.

2. A sealed fluid swivel joint as claimed in claim 1, said swivel joint defining a radial seal configuration in which said ring-shaped clearance gap defines a cylindrically-shaped clearance gap positioned symmetrically around said common central longitudinal axis.

3. A sealed fluid swivel joint as claimed in claim 1, said swivel joint defining a face seal configuration in which said ring-shaped clearance gap extends symmetrically around said common central longitudinal axis and defines a radially flat-shaped clearance gap.

4. A sealed fluid swivel joint as claimed in claim 1, said biasing means including a spring means positioned in said seal housing groove for spring biasing said annular sealing member against a sealing face on said second joint ring.

5. A sealed fluid swivel joint as claimed in claim 4, said spring means including a coil compression spring extending between a wall of said seal housing groove and said annular seal.

6. A sealed fluid swivel joint as claimed in claim 4, said spring means including a spring extending circumferentially around said annular seal in said annular seal housing groove.

7. A sealed fluid swivel joint as claimed in claim 4, said spring means being positioned against said antiextrusion ring and spring biasing said antiextrusion ring against said annular sealing member to cause it to bear against a sealing face on said second joint ring.

8. A sealed fluid swivel joint as claimed in claim 4, wherein said biasing means is also responsive to the pressure differential existing across said annular seal to pressure bias said annular sealing member against a sealing face.

9. A sealed fluid swivel joint as claimed in claim 8, wherein said biasing means is responsive to the pressure differential existing across said annular seal to pressure bias said antiextrusion ring against said annular sealing member to cause it to bear against a sealing face on said second joint ring.

10. A sealed fluid swivel joint as claimed in claim 1, wherein said biasing means is responsive to the pressure differential existing across said annular seal to pressure bias said antiextrusion ring against said annular sealing member to cause it to bear against a sealing face on said second joint ring.

11. A sealed fluid swivel joint as claimed in claim 1, wherein said pressure responsive biasing means includes an antiextrusion ring having an L-shaped cross section with the two L legs disposed substantially orthogonally with respect to each other, and said annular sealing member is positioned between the L legs of said antiextrusion ring.

12. A sealed fluid swivel joint as claimed in claim 11, wherein said V-shaped concave slot has its V opening facing in the direction of said annular clearance gap.

13. A sealed fluid swivel joint as claimed in claim 11, wherein said V-shaped concave slot has its V opening facing orthogonally away from the direction of said annular clearance gap.

14. A sealed fluid swivel joint as claimed in claim 1, wherein said annular seal includes an annular, secondary sealing member positioned intermediate said pliant sealing member and said antiextrusion ring.

15. A sealed fluid swivel joint as claimed in claim 14, including O-rings positioned between said pliant sealing member and said secondary sealing member, and between said secondary sealing member and said antiextrusion ring.

16. A sealed fluid swivel joint as claimed in claim 1, said antiextrusion ring defining a recess extending along its annular length for housing said pliant sealing member, and said biasing means biasing said antiextrusion ring against said annular sealing member to cause it to bear against a sealing surface.

17. A sealed fluid swivel joint as claimed in claim 16, said antiextrusion ring having an L shaped cross-section with the two L legs disposed substantially orthogonally with respect to each other to define said recess, and said annular sealing member being positioned between the L legs of said antiextrusion ring.

18. A sealed fluid swivel joint as claimed in claim 1, said antiextrusion ring being formed as one integral component with said annular, pliant sealing member.

* * * * *